United States Patent
Yamamoto et al.

[11] Patent Number: 5,828,453
[45] Date of Patent: Oct. 27, 1998

[54] LENS DESIGNING METHOD AND OBJECTIVE LENS APPARATUS WITH TWO LENSES

[75] Inventors: Kenji Yamamoto, Saitama; Isao Ichimura, Kanagawa; Fumisada Maeda, Tokyo; Toshio Watanabe, Kanagawa; Kiyoshi Ohsato, Chiba, all of Japan

[73] Assignee: Sony Corporation, Tokyo, Japan

[21] Appl. No.: 812,736

[22] Filed: Mar. 6, 1997

[30] Foreign Application Priority Data

Mar. 13, 1996 [JP] Japan ................... 8-055676

[51] Int. Cl.$^6$ ........................................ G01B 9/02
[52] U.S. Cl. ................... 356/345; 356/360; 359/654; 359/794
[58] Field of Search ............... 356/345, 360; 359/794, 654; 350/432; 369/100, 112

[56] References Cited

U.S. PATENT DOCUMENTS

| | | | |
|---|---|---|---|
| 4,537,473 | 8/1985 | Maschmeyer | 350/432 |
| 4,577,941 | 3/1986 | Kubota | 350/582 |
| 4,789,978 | 12/1988 | Shikama et al. | 369/112 |
| 5,161,063 | 11/1992 | Krill et al. | 359/654 |
| 5,311,494 | 5/1994 | Sugita et al. | 369/100 |
| 5,475,537 | 12/1995 | Kobayashi et al. | 359/794 |
| 5,508,992 | 4/1996 | Hirose et al. | 369/109 |
| 5,699,341 | 12/1997 | Sugi et al. | 369/112 |
| 5,724,335 | 3/1998 | Kobayashi | 369/112 |

*Primary Examiner*—Frank G. Font
*Assistant Examiner*—Tu T. Nguyen
*Attorney, Agent, or Firm*—Ronald P. Kananen

[57] ABSTRACT

A method for designing an objective lens apparatus formed by at least two lenses, a first lens and a second lens, which includes the steps of: measuring aberration which occurs when a light beam is converged by the first lens; setting the first lens is set such that the aberration occurring in the first lens satisfies Maréchal's criterion, in accordance with the measurement results; measuring aberration which occurs when a light beam is converged by the first lens and the second lens; and setting the second lens such that the aberrations occurring in the first lens and the second lens satisfy Maréchal's criterion, in accordance with the measurement results. Accordingly, an objective lens apparatus with a small aberration and a large numerical aperture NA can be designed by this method.

19 Claims, 9 Drawing Sheets

LENS DESIGNING METHOD AND OBJECTIVE LENS APPARATUS WITH TWO LENSES

BACKGROUND OF THE INVENTION

1. Field of the Invention

The present invention broadly relates to a lens designing method, and, more particularly, to a lens designing method for separately determining the aberrations of a first lens and a second lens forming a two lens assembly which allows the numerical aperture NA to be increased and records or reproduces information of two recording media having different substrate thicknesses.

2. Description of the Related Art

In recent years, the moving picture expert group (MPEG) system has put into practical use a technique for performing recording and reproducing operations on a recording medium by compressing image signals and audio signals to a high density. In the audio visual (AD) field, the digital video disk (DVD) is drawing attention as the next generation optical disk recording medium, while in the computer field, the optical disk for high-capacity recording by opto-magnetic recording method or phase change method is drawing attention as the next generation optical disk recording medium. A DVD for recording thereon image signals and audio signals based on MPEG and an optical disk for recording thereon a large quantity of data than was previously possible have been proposed.

Accordingly, in order to record digital data at a high density onto, for example, a DVD or other recording media allowing high capacity recording, it is necessary to decrease the size of the spot formed by the light beam compared to the sizes of spots formed on conventional recording media such as compact disks (CD).

When the spot size of the light beam has radius R, the objective lens has an exit angle θ, and the light beam has a wavelength λ, the radius R of the spot size of the light beam is roughly:

$$R = 0.32\lambda/\text{SIN } \theta \qquad (1)$$

From Formula (1), the spot size of the light beam is reduced by decreasing the wavelength λ of the light beam and increasing the numerical aperture NA of the objective lens (SIN θ (=n*SIN θ: In air, the index of refraction N is 1).

Although the numerical aperture NA can be made larger by increasing the diameter of the objective lens, this not only results in a larger optical head which records or reproduces information on and from a disk, but also makes it difficult to perform focusing control and tracking control operations due to a larger mass.

To overcome the above-described problems, the use of a solid immersion lens has been proposed, which is disclosed, for example, in U.S. Pat. No. 5,125,750, to irradiate a recording light beam or a reproducing light beam onto a disk.

In the proposal, as illustrated for example in FIG. 16, a light beam is converged by an objective lens L1 and impinges upon a solid immersion lens having a spherical light-entering surface and a planar light-exiting surface. From the objective lens L1, the light beam impinges perpendicular to the spherical surface of the solid immersion lens L2, so that the light beam converges at the center of the planar light-exiting surface. Accordingly, when the index of refraction of the solid immersion lens L2 is n, the numerical aperture NA of the objective lens L1 can be made substantially n times the original value.

However, since it is actually necessary to converge the light beam from the solid immersion lens L2 onto a disk (not shown), the thickness of the solid immersion lens L2 is set at a value which is smaller by an amount corresponding to the thickness of the substrate of the disk, such that the light beam actually converges on the disk.

In order to obtain a large NA, the light beam from the objective lens L1 is slightly refracted at the spherical surface of the solid immersion lens L2, as shown in FIG. 17.

In order to produce an objective lens apparatus with, for example, a single lens in order to converge the light beam on the disk, it is necessary to form the spherical surface of the objective lens apparatus into a perfectly spherical surface to correct wave aberration of the objective lens apparatus. Therefore, it is difficult to precisely produce the die used to produce a glass molded objective lens.

Therefore, accurate production of an objective lens is ordinarily achieved by repeating the processes of measuring the aberration occurring in the objective lens formed by a predetermined die using, for example, an interferometer, modifying the die of the objective lens based on the measurement results, and producing an objective lens using the modified die, when necessary.

However, when the lens apparatus for converging the light beam is formed by a two lens assembly as described above, it becomes necessary to produce each lens such that no aberration occurs when these two lenses are combined. The individual lenses obviously have predetermined aberrations, so that it is difficult to use the conventional producing method which consists in using, for example, an interferometer to measure the aberrations occurring in the two combined lenses and modifying the dies used for producing the lenses, based on the measurement results. In addition, since the individual lenses have predetermined aberrations when an aberration occurs in the produced two lens assembly, it becomes difficult to judge which lens needs to be corrected for aberration and the manner in which the lens needs to be corrected. As a result, the aberration of the produced two lens assembly cannot be easily corrected, thus making it difficult to produce the two lens assembly based exactly on the design values.

SUMMARY OF THE INVENTION

Accordingly, in view of the above-described problems, an object of the present invention is to make it possible to separately determine the aberration of each lens of a two lens assembly, and separately produce each lens, thereby facilitating production of a two lens assembly having no aberration.

DESCRIPTION OF THE PREFERRED EMBODIMENTS

Figure 1:
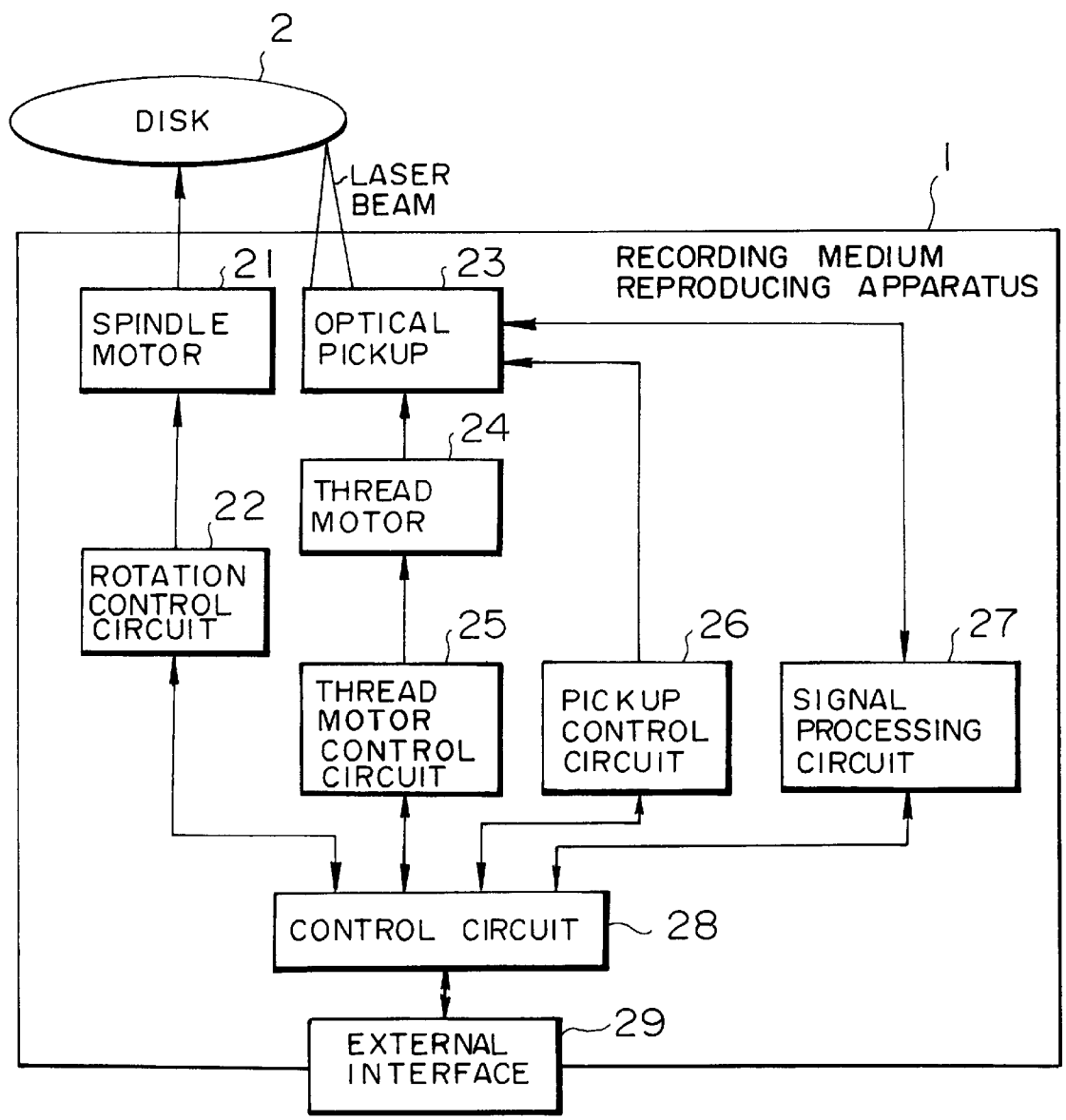
FIG. 1 is a block diagram showing the construction of an embodiment of a recording medium reproducing apparatus 1 to which a lens designing method in accordance with the present invention is applied.

FIG. 1 is a block diagram showing the construction of an embodiment of a recording medium reproducing apparatus 1 to which a lens designing method in accordance with the present invention is applied.

The spindle motor 21 is such as to rotate a disk 2 in accordance with a command generated from a rotation control circuit 22 which drives the spindle motor 21 in accordance with a command generated from a control circuit 28.

The optical pickup 23 causes convergence of a light beam onto an information recording layer of the disk 2 in order to convert the light beam reflected from the information recording layer of the disk 2 into a reproduction signal which is output to a signal processing circuit 27.

The thread motor 24 causes the optical pickup 23 to move to the position of the desired track of the information recording layer of the disk 2.

The thread motor control circuit 25 causes the thread motor 24 to be driven in accordance with a command from the control circuit 28.

The pickup control circuit 26 controls the focusing actuator and the tracking actuator in the optical pickup 23 in accordance with a command from the control circuit 28.

The signal processing circuit 27 demodulates the reproduction signal from the optical pickup 23 and handles any signal errors. In addition, the signal processing circuit 27 detects, for example, the thickness (or type) of the substrate of the disk 2 from the RF signal level, and the detection signal is output to the control circuit 28.

The control circuit 28 is constructed so as to output a command to the rotation control circuit 22, the thread motor control circuit 25, the pickup control circuit 26, and the signal processing circuit 27, in accordance with the command signal input through an external interface 29. The control circuit 28 is also constructed so as to output the reproduction signal, input from the signal processing circuit 27 through the external interface 29, to an external device.

Figure 2:
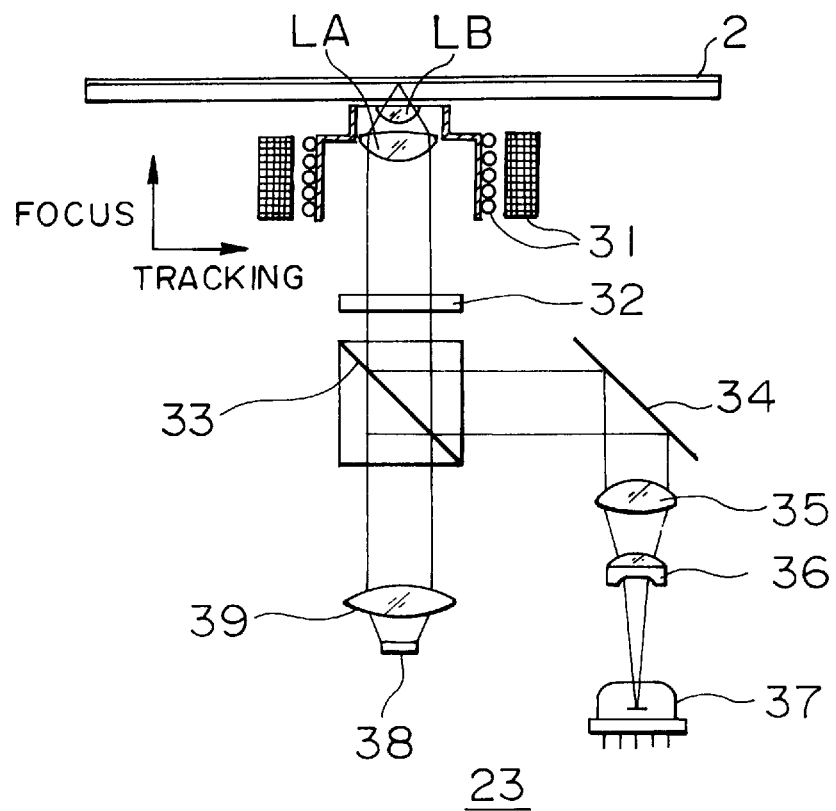
FIG. 2 is a diagram showing the construction of the optical pickup 23 of an embodiment in accordance with the present invention.

FIG. 2 is a diagram showing the construction of the optical pickup 23 of an embodiment in accordance with the present invention.

In the optical pickup 23, the light beam emitted from a laser diode 38 is collimated by a collimator lens 39. The collimated light beam passes through a polarization beam splitter 33 and a ¼ wavelength plate 32, and then impinges upon a two lens assembly comprising a first lens LA and a second lens LB having the surface facing the disk 2 formed into a planar or aspherical surface and the other surface formed into a curved, but aspherical, surface. From the two lens assembly, the light beam converges on an information recording surface of the disk 2. In this case, a large numerical aperture NA can be obtained compared to the case where an objective lens is used singly, since the light beam is converged by the two lens assembly. In addition, recording and reproducing operations can be performed on a high-density disk.

The aforementioned light beam, reflected from the information recording surface of the disk 2 and which has passed through the two lens assembly (the second lens LB and the first lens LA) and the ¼ wavelength plate 32, impinges upon the polarization beam splitter 33 and is reflected thereby. The reflected light passes through a focusing lens 35 and a multi-lens 36 and converges on a photodetector 37 disposed at a conjugate point in order to be converted into a reproduction signal.

The electromagnetic actuator assembly 31 comprises a focusing actuator which moves the two lens assembly in the axial direction and a tracking actuator which moves the two lens assembly so as to follow the center of a track. Therefore, the assembly 31 performs focusing servo and tracking servo operations.

Figure 3:
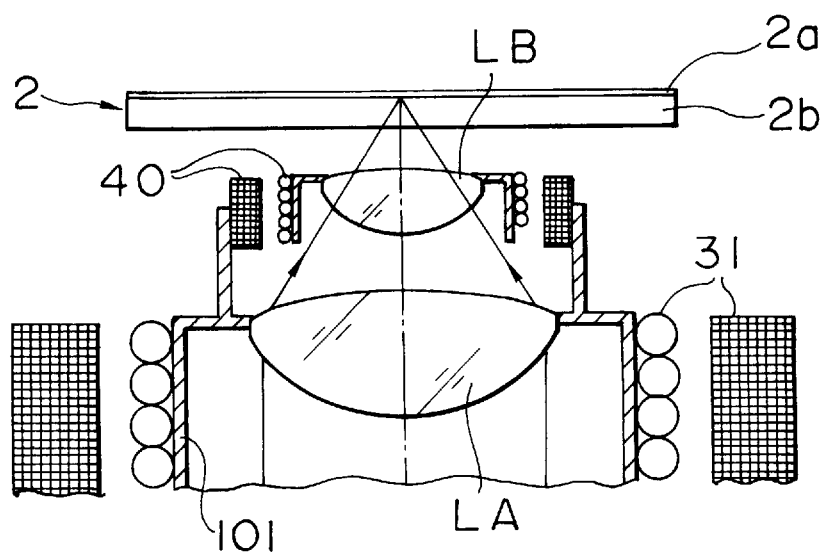
FIG. 3 is an enlarged view of the actuating portion of the two lenses of the optical pickup 23.

FIG. 3 is an enlarged view of the actuating portion of the two lens assembly of the optical pickup 23 of FIG. 2. In FIG. 3, corresponding or similar parts to those of FIG. 2 are given the same reference numerals, so that descriptions thereof will be given when required.

The light beam, converged by the first lens LA, passes through the second lens LB which converges it onto a information recording surface 2a of the disk 2 having a substrate 2b formed from a light-transmitting material, such as polycarbonate, into a predetermined thickness.

The second lens LB is connected to a bobbin 101 of the first lens LA by means of an electromagnetic actuator 40. The distance between the first lens LA and the second lens LB is controlled by the electromagnetic actuator 40 to a predetermined value, when the optical axes coincide.

A description will now be given of performing reproducing operations on two types of disks, disks 2-1 and 2—2, having different substrate (formed from a light-transmitting material such as polycarbonate) thicknesses and numerical aperture specifications, with reference to FIGS. 4 to 7.

Figure 4:
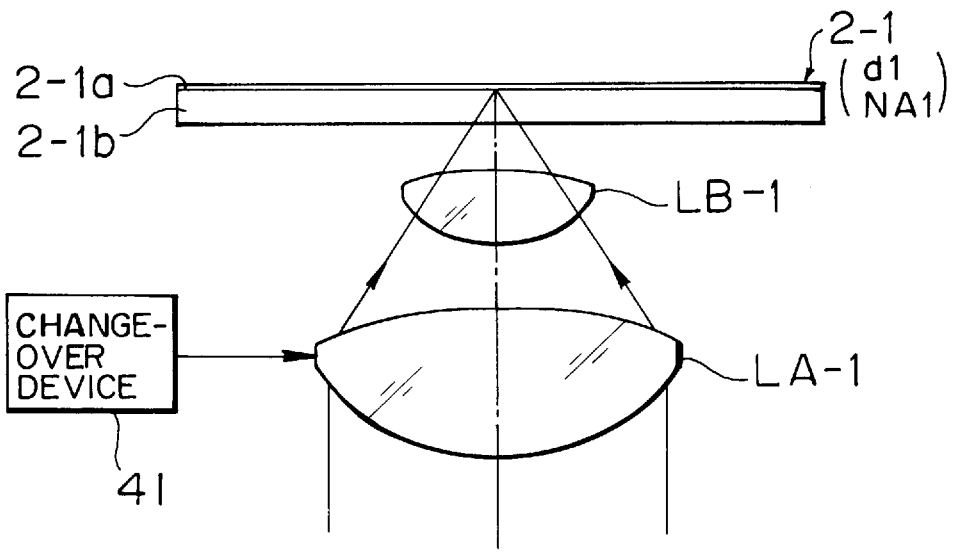
FIG. 4 is a diagram showing the construction of a two lens assembly in Embodiment 1 of the present invention.

FIG. 4 is a diagram showing the construction of the two lens assembly in Embodiment 1 of the present invention.

In the two lens assembly of FIG. 4, the second lens LB-1 produces no aberration with respect to the disk 2—2 (of FIG. 5) having a light-transmitting substrate 2—2b thickness of d2 and a lens numerical aperture specification of NA2, and is designed to have the numerical aperture specification value of NA2. When the first lens LA-1 is used in combination with the second lens LB-1, the first lens LA-1 produces no aberration with respect to the disk 2-1 having a light-transmitting substrate 2-1b thickness of d1 (where d1≦d2) and a lens numerical aperture specification value of NA1, and is designed to have the numerical aperture specification value of NA1. In the specification, "no aberration" means an aberration value which satisfies Marechal's criterion. In the present embodiment, numerical aperture NA1>numerical aperture NA2.

The change-over device 41 causes the first lens LA-1 to move in and out of the optical path, in accordance with the type of disk 2 specified by the information supplied from the pickup control circuit 26.

More specifically, the signal processing circuit 27 detects the thickness of the substrate of the disk 2 (or type of disk 2) from the RF signal level, and outputs the detected thickness to the control circuit 28. In accordance with the detected thickness, the control circuit 28 supplies a predetermined control command to the change-over device 41 through the pickup control circuit 26. As shown in FIG. 4, the change-over device 41 causes the first lens LA-1 to move into the optical path, so that the first lens LA-1 and the second lens LB-2 of the two lens assembly are used to converge the light beam onto an information recording surface 2-1a of the disk 2-1 having light-transmitting substrate 2-1b thickness d1 and numerical aperture specification value NA1. In this case, no aberration occurs and numerical aperture specification value of NA1 is realized.

A description will now be given of the case where reproduction operations are performed on the disk 2—2, instead of on the disk 2-1.

In this case, the signal processing circuit 27 detects the thickness of the light-transmitting substrate of the disk 2 (or the type of disk 2) from the RF signal level, and the detected thickness is output to the control circuit 28. In accordance with the detected thickness, the control circuit 28 sends a predetermined control command to the change-over device 41 through the pickup control circuit 26. In accordance with the control command, the change-over device 41 causes the first lens LA-1 to move out of the optical path, so that the optical pickup 23 is set in correspondence with the disk 2—2, as shown in FIG. 5.

Figure 5:
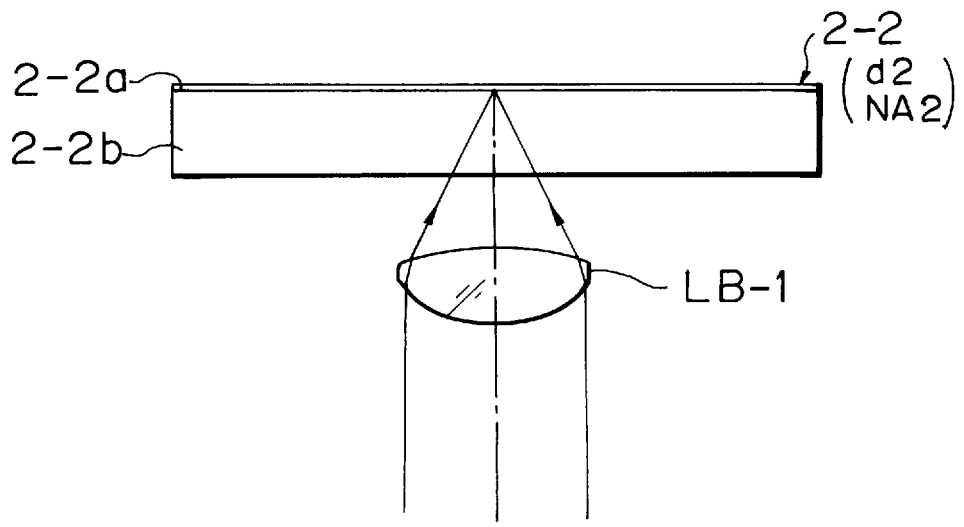
FIG. 5 is a diagram showing the first lens LA-1 of the two lens assembly of FIG. 4 moved out of an optical path.

More specifically, as shown in FIG. 5, only the second lens LB-1 is used to converge the light beam onto the information recording surface 2—2a of the disk 2—2 having substrate thickness d2 and numerical aperture specification value NA2. In this case, the no aberration occurs and numerical aperture specification value of NA2 is realized.

Accordingly, it is possible to properly reproduce data on different types of disk 2 by moving the first lens LA-1 into and out of the optical path, in accordance with the disk 2 type.

Figure 6:
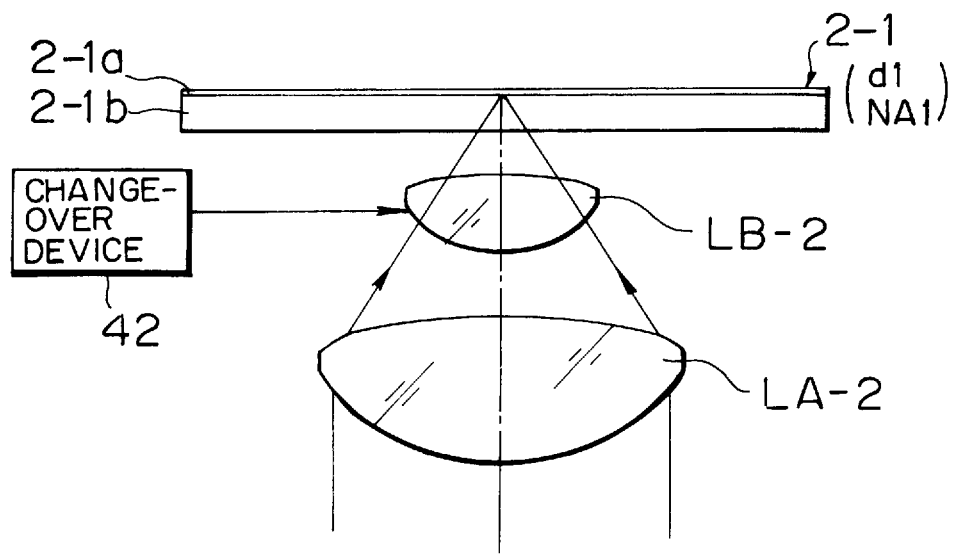
FIG. 6 is a diagram showing the construction of a two lens assembly in Embodiment 2 of the present invention.

FIG. 6 is a diagram showing the construction of the second lens assembly in Embodiment 2.

Figure 7:
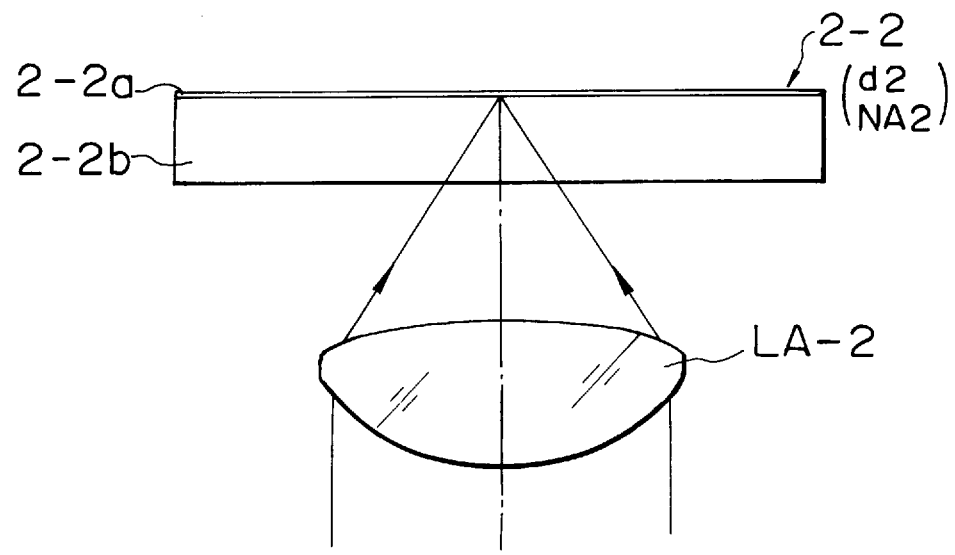
FIG. 7 is a diagram showing the second lens LB-2 of the two lens assembly of FIG. 6 moved out of an optical path.

In the two lens assembly of FIG. 6, the first lens LA-2 produces no aberration with respect to the disk 2—2 having substrate 2—2b thickness d2 and numerical aperture specification value NA2, and is designed to have numerical aperture specification value NA2 (FIG. 7). When the second lens LB-2 is used in combination with the first lens LA-2, it produces no aberration with respect to the disk 2-1 having substrate 2-1b thickness d1 and numerical aperture specification value NA1, and is designed to have numerical aperture specification value NA1.

The change-over device 42 causes the second lens LB-2 to move in and out of the optical path, in accordance with the type of disk 2 specified by the information supplied from the pickup control circuit 26.

More specifically, when the disk 2-1 is detected, the control circuit 28 controls the change-over circuit 42 through the pickup control circuit 26, causing the second lens LB-2 to move into the optical path, as shown in FIG. 6, so that the first lens LA-2 and the second lens LB-2 of the two lens assembly are used to converge the light beam onto the information recording surface 2-1a of the disk 2-1 having substrate 2-1b thickness d1 and numerical aperture specification value NA1. This produces no aberration and allows the numerical aperture specification of NA1 to be realized.

It will now be assumed that reproducing operations are started and performed on the disk 2—2, instead of the disk 2-1.

Here, in accordance with the control signal from the pickup control circuit 26, the change-over device 42 causes the second lens LB-2 to move out of the optical path, so that the optical pickup 23 is set in correspondence with the disk 2—2, as shown in FIG. 7.

More specifically, as shown in FIG. 7, only the first lens LA-2 alone is used to converge the light beam onto the information recording surface 2—2a of the disk 2—2 having substrate 2—2b thickness d2 and numerical aperture specification value NA2. This produces no aberration and allows numerical aperture specification value of NA2 to be achieved.

Accordingly, it is possible to selectively reproduce data on different disk types with the optical pickup 23 by moving the second lens LB-2 in and out of the optical path.

Although in the foregoing description, the two lens assembly comprising one second lens and one first lens was used to reproduce data on two disk types having different substrate thicknesses and numerical aperture specification values, the lens assembly may be an N lens assembly having an N number of lenses. In such a case, it is possible to reproduce data on an N number of disks having different numerical aperture specification values and substrate thicknesses with the optical pickup 23 using the lens designing method described below.

A description will now be given of the method of designing individual lenses of an N lens assembly, with reference to FIGS. 8 to 15. FIGS. 8 to 15 illustrate the case where a two lens assembly is used to simplify the description.

A description will first be given of the method of designing the first lens LA-1 and the second lens LA-2 of the two lens assembly in the embodiments illustrated in FIGS. 4 and 5, with reference to FIGS. 8 to 11.

Figure 8:
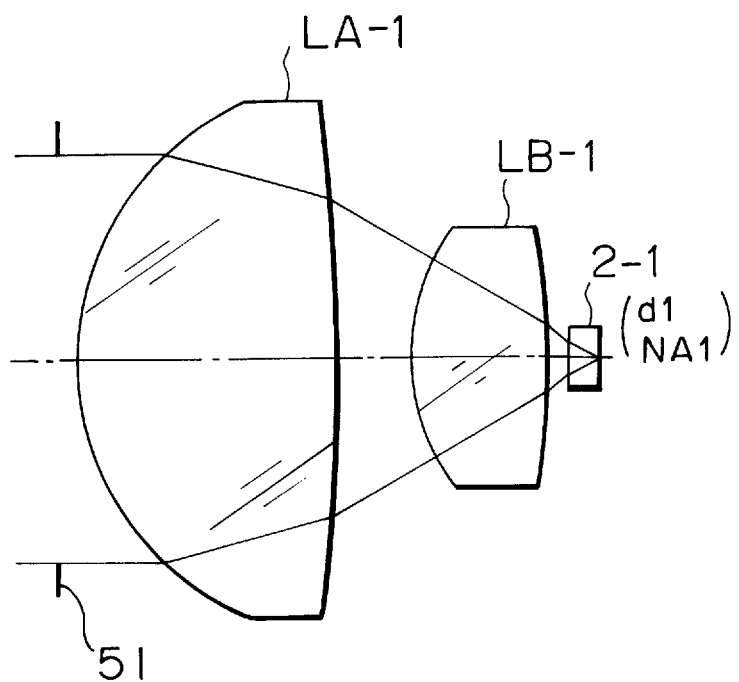
FIG. 8 is a diagram showing the optical path when the two lens assembly of FIG. 4 is used.

FIG. 8 shows the exact shape of a curved surface of each lens of the two lens assembly and the optical path in Embodiment 1. As shown in FIG. 8, the light beam, which has passed through a stop 51, passes through the first lens LA-1 and the second lens LB-1, which converge the light beam upon the disk 2-1 having numerical aperture specification value NA1 and substrate 2-1b thickness d1.

When the second lens LB-1 is used singly, as shown in FIG. 5, the lens LB-1 is formed in correspondence with the disk 2—2. Therefore, the second lens LB-1 can be designed and produced by the above-described methods involving measurement of aberration using an interferometer and modification of the die.

Figure 9:
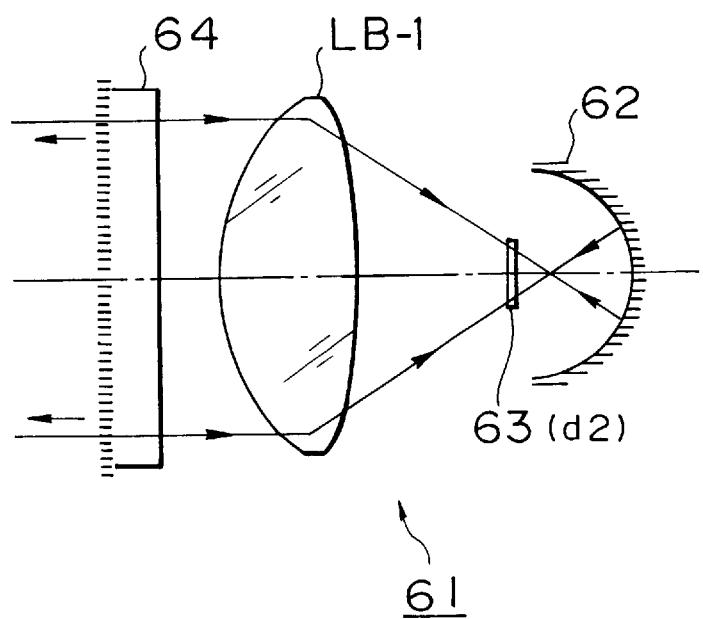
FIG. 9 is a diagram showing the aberration of the second lens LB-1 of FIG. 8 with respect to the substrate 63 being measured.

FIG. 9 is a diagram showing the aberration of the second lens LB-1 with respect to the thickness of the substrate 2—2b of the disk 2—2, being measured with an interferometer 61.

The light beam emitted from a light source (not shown) of the interferometer 61 passes through a reference plane 64 and impinges upon the second lens LB-1 which converges the light beam. The converged light beam then passes through a light-transmitting substrate 63 made of the same material as that of the disk 2—2 and having substrate thickness d2, whereby an image is formed on the optical axis of the second lens LB-1. Here, the thickness d2 of the substrate 63 includes 0 thickness.

A reference spherical surface 62 whose center is defined by the imaging point located in opposing relation to the substrate 63 reflects, for example, about 4% of the total amount of the light beam. The reflected light beam travels back again through the imaging point, the substrate 63, and the second lens LB-1, and impinges upon the reference plane 64. The interference image on the reference plane 64 is taken by a CCD camera (not shown) of the interferometer 61. Therefore, the aberration which occurs in the second lens LB-1 with respect to the substrate 63 can be measured in terms of the tilting of the interference image on the CCD camera.

In this way, the aberration of the second lens LB-1 with respect to the disk 2—2 (substrate 63) is measured to modify the die of the second lens LB-1 in accordance with the measurement results. The modified die is used to repeat the step of producing the second lens LB-1 into one having a predetermined curved (aspherical) surface which sufficiently reduces aberration.

In the same way, it is possible to relatively easily produce the second lens LB-1 whose aberration is corrected with respect to the disk 2—2.

Figure 10:
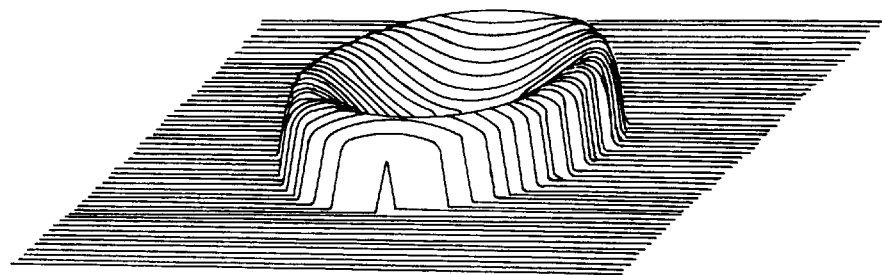
FIG. 10 is a diagram illustrating the aberration of the first lens LA-1 alone.

As shown in FIG. 8, in the case where the aberration of the first lens LA-1 alone is measured with an interferometer (with the substrate having 0 thickness) in order to form the first lens LA-1 such that it does not produce aberration when a light beam is converged onto the disk 2-1 using the two lens assembly formed by the first lens LA-1 and the second lens LB-1, it is obvious that the predetermined aberration is obtained. The aberration which occurs in such a case is illustrated in FIG. 10 showing the amount of aberration three-dimensionally in terms of height.

The aberration of the first lens LA-1 with respect to the substrate having thickness d1, is measured, while the first lens LA-1 is arranged in combination with the second lens LB-1 corrected for aberration with respect to the disk 2—2.

Figure 11:
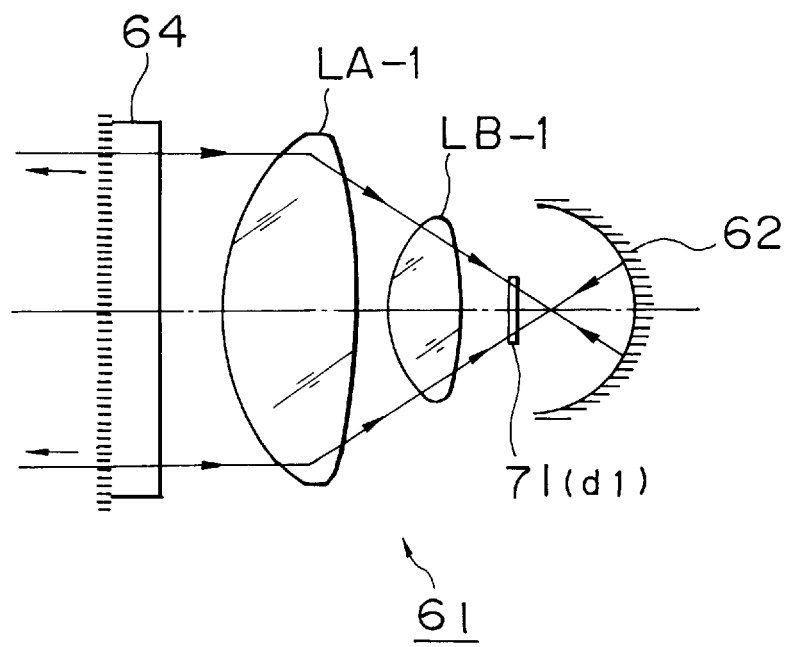
FIG. 11 is a diagram showing the aberration of the first lens LA-1 of FIG. 8 being measured.

FIG. 11 is a diagram showing the aberration with respect to a light-transmitting substrate 71 with a thickness of d1, being measured using the two lens assembly which is a combination of the first lens LA-1 and the second lens LB-1 previously corrected for aberration with respect to the disk 2—2. In FIG. 11, corresponding or similar parts to those of FIG. 9.are given the same reference numerals, and unnecessary descriptions thereof will be omitted. Here, the thickness d1 of the substrate 71 includes zero thickness.

The substrate 71 is made of the same material and is of the same thickness as the substrate 2-1b of the disk 2-1. The light beam emitted from the light source passes through the reference plane 64, the first lens. LA-1, the second lens LB-1, and the substrate 71, and converges on a point on the optical axis of the first lens LA-1 and the second lens LB-1. A portion of the converged light beam is reflected back by the reference spherical surface 62 through the same optical path, whereby an interference image is formed on the reference plane 64.

In this case, the second lens LB-1 is one sufficiently corrected for aberration with respect to the substrate having thickness d2, so that the tilting of the interference image can be used to indicate the aberration of the first lens LA-1.

Therefore, the die for forming a curved surface of the first lens LA-1 is modified, based on the tilting of the interference image.

Accordingly, since the aberrations of the first lens LA-1 and the second lens LB-1 of the two lens assembly can be separately determined and corrected, it is possible to easily produce the two lens assembly satisfying the specifications illustrated in FIGS. 4 and 5. In the specifications, the first lens LA-1 and the second lens LB-1 are used to reproduce data on the disk 2-1, while the second lens LB-1 is used to reproduce data on the disk 2—2.

A description will now be given of the method for producing the first lens LA-2 and the second lens LB-2 of the two lens assembly in Embodiment 2 illustrated in FIGS. 6 and 7, with reference to FIGS. 12 to 15.

Figure 12:
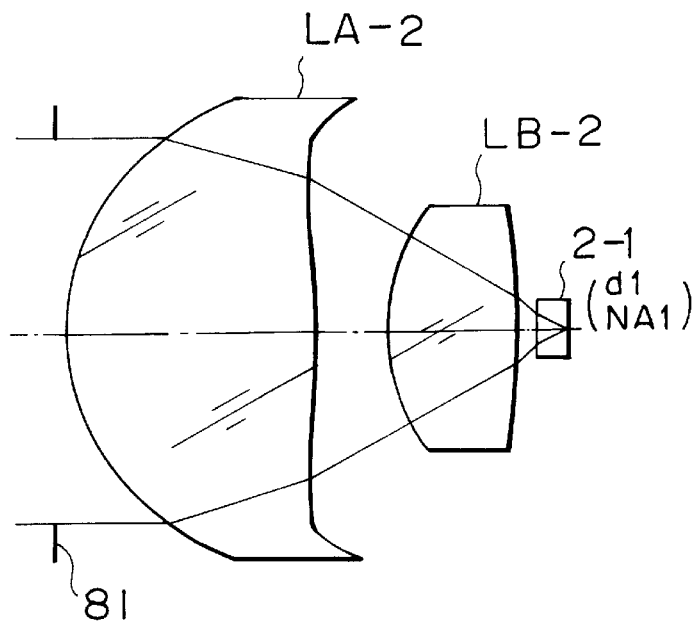
FIG. 12 is a diagram showing the optical path when the two lens assembly of FIG. 6 is used.

FIG. 12 is a diagram showing the exact shape of a curved surface of each lens of the two lens assembly and the optical path in Embodiment 2. As shown in FIG. 12, the light beam, which has passed through the stop 81, passes through the first lens LA-2 and the second lens LB-2, which converge the light beam on the disk 2-1.

Similarly, as previously described with reference to FIG. 9, the conventional methods are used to correct the first lens LA-2 such that it does not produce aberration with respect to the substrate with thickness d2.

Figure 13:
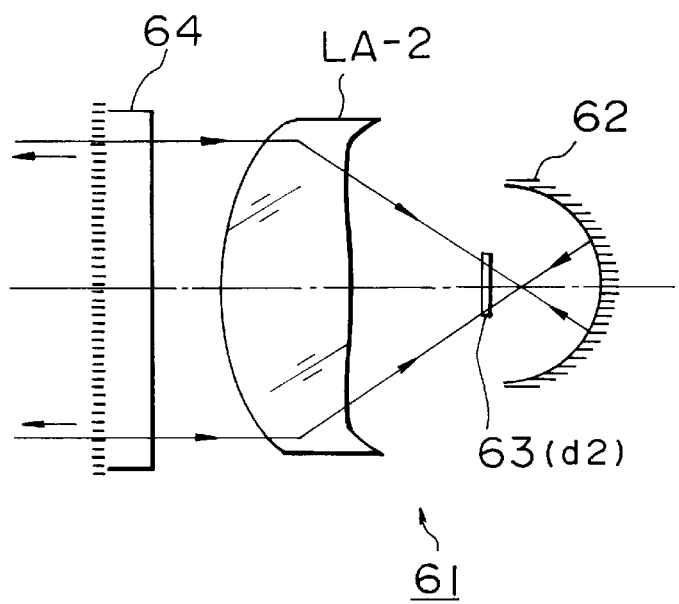
FIG. 13 is a diagram showing the aberration of the first lens LA-2 of FIG. 12 with respect to the substrate 63 being measured.

More specifically, as shown in FIG. 13, the interferometer 61 is used to measure the aberration occurring in the first lens LA-2 alone with respect to the light-transmitting substrate 63 made of the same material and having the same thickness as those of the substrate of the disk 2—2.

The light beam, emitted from the light source, passes through the reference plane 64 and impinges upon the first lens LA-2 which converges the light beam. The converged light beam passes through the substrate 63 with thickness d2 to form an image on the optical axis of the first lens LA-2. Part of the light beam is then reflected back by the reference spherical surface 62 through the same optical path to form an interference image on the reference plane 64.

Accordingly, the aberration occurring in the first lens LA-1 with respect to the disk 2—2 (substrate 63), is measured in order to modify the die for forming the first lens LA-2, based on the measurement results.

Figure 14:
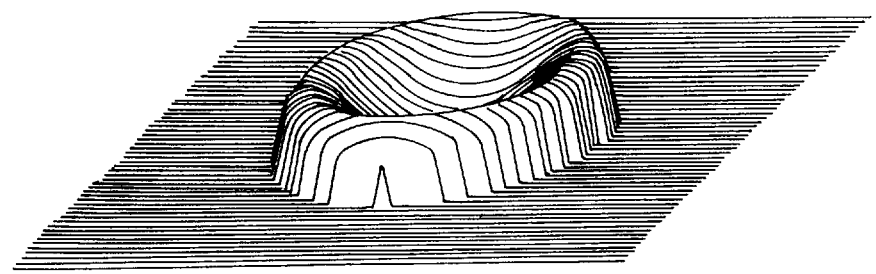
FIG. 14 is a diagram illustrating the aberration of the second lens LB-2 alone.

As with the case illustrated in FIG. 8, in the case where the aberration of the second lens LB-2 alone is measured with the interferometer 61 (with the substrate thickness being 0) such that the second lens LB-2 does not produce aberration when a light beam is converged onto the disk 2-1 using the two lens assembly comprising the first lens LA-2 and the second lens LB-2, the predetermined aberration is obviously obtained. The aberration which occurs in this case is illustrated in FIG. 14.

Accordingly, the aberration of the second lens LB-2 with respect to the substrate thickness d1, is measured, while the second lens LB-2 is arranged in combination with the first lens LA-2 corrected for aberration with respect to the disk 2—2.

Figure 15:
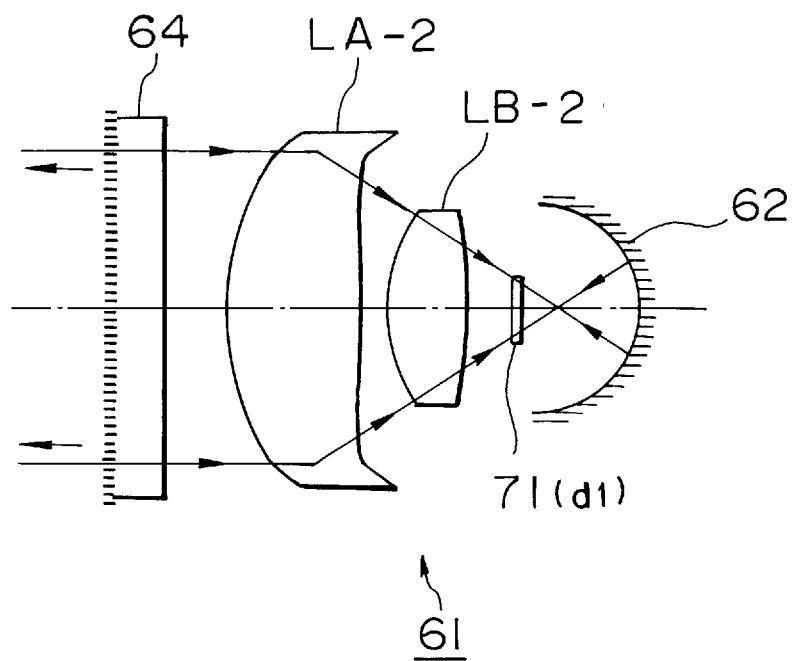
FIG. 15 is a diagram showing the aberration of the second lens LB-2 of FIG. 12 being measured.
Figure 16:
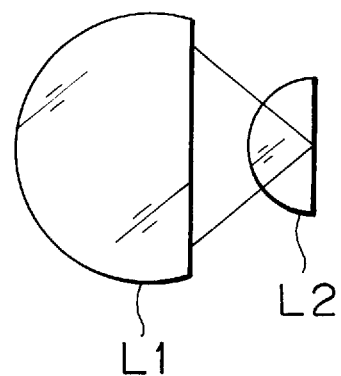
FIG. 16 is a diagram illustrating the principle of a solid immersion lens.
Figure 17:
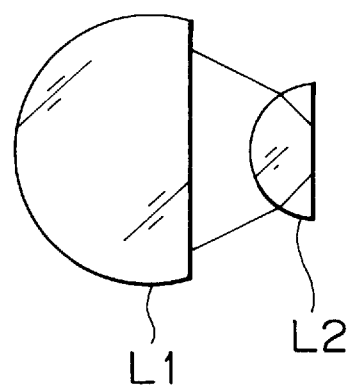
FIG. 17 is a diagram showing the solid immersion lens being in actual use.

FIG. 15 is a diagram illustrating the aberration of the second lens LB-2 with respect to the substrate with thickness d1, being measured using the two lens assembly which is combination of the second lens LB-2 and the first lens LA-2 previously corrected for aberration with respect to the disk 2—2.

The light-transmitting substrate 71 is made of the same material and is of the same thickness as the substrate of the disk 2-1. The light beam emitted from the light source travels through the reference plane 64, the first lens LA-2, the second lens LB-2, and the substrate 71 and converges on a point on the optical axis of the first lens LA-2 and the second lens LB-2. Then, part of the light beam is reflected back by the reference spherical surface 62 through the same path to form an interference image on the reference plane 64 in correspondence with the aberration.

In this case, the first lens LA-2 is one which has been sufficiently corrected for aberration with respect to the thickness d2 of the substrate, so that the tilting of the interference image can be used to indicate the aberration of the second lens LB-2. Therefore, the die used for forming a curved surface of the second lens LB-2 is modified based on the tilting of the interference image. Although the substrate 63 and the substrate 71 were used in the description, the same substrate may be used. In such a case, only one type of substrate is used.

Accordingly, since the aberrations of the first lens LA-2 and the second lens LB-2 of the two lens assembly can be separately determined and corrected, it is possible to easily produce the two lens assembly satisfying the specifications illustrated in FIGS. 6 and 7. In the specifications, the first lens LA-2 and the second lens LB-2 are used to reproduce data on the disk 2-1, while the first lens LA-2 is used to reproduce data on the disk 2—2.

Although in the foregoing description, the lens designing method was used for a two lens assembly, the designing method may similarly be used for an N lens assembly consisting of an N number of lenses. In such a case, for example, the Nth lens opposing the disk has no aberration with respect to a predetermined substrate thickness, when it is combined with a previously corrected (N-1)th lens.

Accordingly, it is possible to separately determine the aberrations of the first lens and second lens of the two lens assembly, and easily correct the aberrations. In addition, using one pickup including the two lenses makes it possible to achieve a large numerical aperture NA in correspondence with a high-density optical disk, and moving one of the lenses in and out of the optical path allows reproducing operations to be performed on disks with different numerical aperture specification values and substrate thicknesses.

In addition, it is possible to realize a recording medium reproducing apparatus in correspondence with an N number of disks by designing the N lens assembly formed by an N number of lenses as described above.

The present invention can be applied to information recording as well as information recording or reproduction of information of recording media other than disks. In addition, the present invention can be applied to an infinite optical system as well as to a finite optical system.

What is claimed is:

1. A method for designing an objective lens apparatus including at least two lenses, a first lens and a second lens, said method comprising the steps of:

measuring aberration which occurs when a light beam is converged by said first lens;

setting said first lens such that the aberration occurring in said first lens satisfies Maréchal's criterion, in accordance with the measurement results;

measuring aberration which occurs when a light beam is converged by said first lens and said second lens; and setting said second lens such that the aberrations occurring in said first lens and said second lens satisfy Maréchal's criterion, in accordance with the measurement results.

2. A method according to claim 1, wherein the light beam converged by said first lens irradiates a first medium having a light-transmitting substrate with a first thickness, wherein the light beam converged by said first lens and said second lens irradiates a second medium having a light-transmitting substrate with a second thickness, and wherein the light-transmitting substrate of at least one of the first and second media has a thickness of 0.

3. A method according to claim 1, wherein the light beam converged by said first lens irradiates a first medium having a light-transmitting substrate with a first thickness, wherein the light beam converged by said first lens and said second lens irradiates a second medium having a light-transmitting substrate with a second thickness, and wherein the light-transmitting substrates of each of the first and second media have the same thickness.

4. A method according to claim 1, wherein the light beam converged by said first lens and the light beam converged by said first lens and said second lens irradiate the same common medium.

5. A method according to claim 1, wherein said first lens and said second lens are arranged along the direction in which the light beam impinges upon said lenses, and wherein said second lens has the surface facing said first lens formed into an aspherical surface and the opposite surface thereof formed into a planar surface or an aspherical surface.

6. A method according to claim 5, wherein said second lens has a smaller diameter than that of said first lens.

7. A method according to claim 1, wherein said second lens and said first lens are arranged in the direction in which the light beam impinges upon said lenses, and wherein said first lens has the surface facing said second lens formed into an aspherical surface and the surface facing said medium formed into a planar surface or an aspherical surface.

8. A method according to claim 7, wherein said first lens has a smaller diameter than that of said second lens.

9. A method according to claim 1, wherein the aberration is measured with an interferometer.

10. A method according to claim 1, wherein the aberrations of said first lens and said second lens are corrected by producing dies for molding each of said lenses.

11. An objective lens apparatus including at least two lenses, said apparatus comprising:

a first lens which is set such that aberration, occurring when light converges on a first medium having a light-transmitting substrate with a first thickness, satisfies Maréchal's criterion; and a second lens which is set such that aberration, occurring when light converges on a second medium having a light-transmitting substrate with a second thickness by said first lens and said second lens, satisfies Maréchal's criterion.

12. An apparatus according to claim 11, wherein said second lens is disposed between said first lens and said second medium, and wherein said first lens has the surface facing said first lens formed into an aspherical surface and the surface facing said medium formed into a planar surface or an aspherical surface.

13. An apparatus according to claim 12, wherein said second lens has a smaller diameter than said first lens.

14. An apparatus according to claim 11, wherein said first lens is disposed between said second lens and said second medium, and wherein said second lens has the surface facing said second lens formed into an aspherical surface and the opposite surface thereof formed into a planar surface or an aspherical surface.

15. An apparatus according to claim 14, wherein said first lens has a smaller diameter than that of said second lens.

16. An apparatus according to claim 11, further comprising change-over means for selectively changing over optical paths, where the light beam from a light source is converged onto said medium, between a first light path where the light beam is converged by said first lens and a second light path where the light beam is converged by said first lens and said second lens.

17. An apparatus according to claim 11, further comprising moving means for moving either one of said first lens and said second lens away from the optical path where the light beam from the light source is converged on said medium.

18. An apparatus according to claim 11, further comprising actuating means for allowing said first lens and said second lens to be movably supported in the axial direction of said first lens and said second lens and in a direction perpendicular to the axial direction.

19. An apparatus according to claim 11, wherein said first lens and said second lens are supported so as to be movable relative to each other.

* * * * *